Jan. 12, 1965  KIICHI HAMANO  3,165,323
WATER SEAL FOR PUMP
Filed April 17, 1963
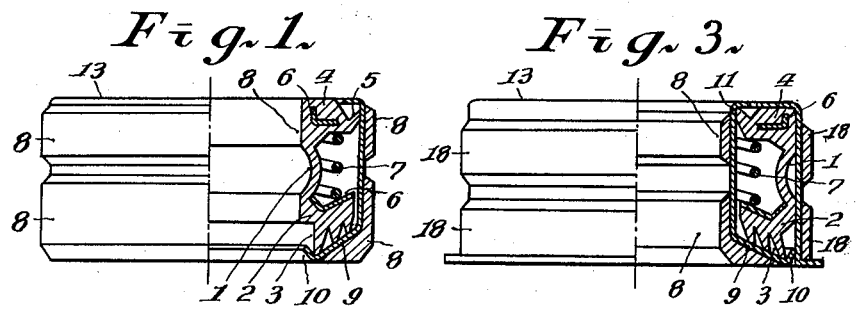
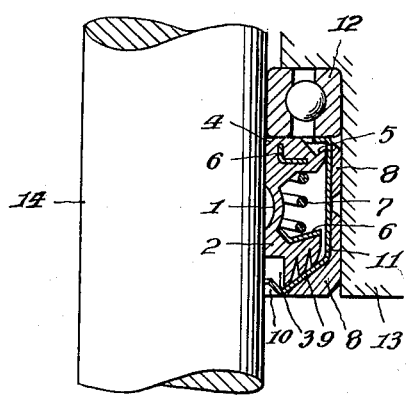
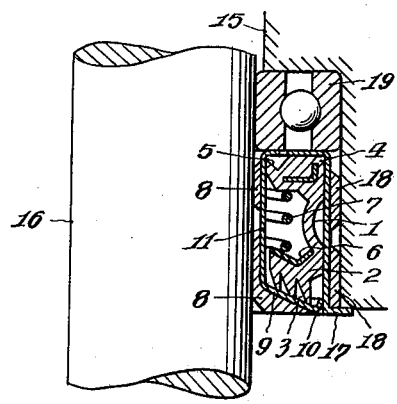
Kiichi Hamano
INVENTOR
BY George B. Onjevich
ATTORNEY

United States Patent Office 3,165,323
Patented Jan. 12, 1965

3,165,323
WATER SEAL FOR PUMP
Kiichi Hamano, 1793 Umeda-cho, Adachi-ku,
Tokyo-to, Japan
Filed Apr. 17, 1963, Ser. No. 273,593
1 Claim. (Cl. 277—41)

The present invention relates to a water seal for a pump and more particularly for a seal between a fixed and a rotating member such as a shaft and housing.

Generally speaking, the present invention contemplates a main seal body having a U-shaped cross-section made of synthetic rubber or other resilient materials, said sealed main body having at the lower position thereof moveable and saw-toothed ribbed edges facing either inwards or outwards in step ladder fashion, and a slidable enclosure with a slanted wall of which one end is enlarged into a funnel shape so as to match the rib slant. The sealed body and the slidable enclosure are closely associated together, further improving the close adherence of the saw-tooth ribs by water pressure, and preventing leakage of lubricating oil such as grease which is inserted into the space that is formed by the sealed main body and the slidable enclosure so as to fit pumps for muddy water or earth and sand contaminated water.

An important object of this invention is to provide a water seal for pump incorporating the above features.

Other objects and advantages of this invention will become apparent from the following description and the accompanying drawings, wherein:

FIG. 1 is a side view, partly cut-away, of a first example of this invention;

FIG. 2 is a cross-sectional view of said first example shown in FIG. 1, wherein the same is attached to a shaft;

FIG. 3 is a side view, partly cut-away, of a second example of this invention; and FIG. 4 is a cross-sectional side view of said second example shown in FIG. 3, wherein the same is attached to a shaft.

The first embodiment is shown in FIGS. 1 and 2 and comprises a sealed main body which is fixed to the shaft and which rotates together with the shaft, said sealed main body sliding and revolving within the slidable enclosure. As shown in FIGS. 1 and 2 a U-shaped cross-section sealed main body 1 is made of synthetic rubber, the end of the lower slidable portion 2 of said sealed main body 1 having saw-toothed ribs 3 slanting like a step-ladder, the edges facing inward the upper portion of moving body 4 having a slidable enclosure rib 5 around the outer rim, both upper and lower sliding bodies 2 and 4 being fitted with a reinforcing metal ring 6, and a spiral spring 7 being inserted between rings 6. Said sealed main body 1 is enclosed within a slidable enclosure 11 fitted with housing ribs 8 around the outer rim, the lower portion of which is contracted into a funnel shape having a slanting wall 9 to fit the slant of rib 3 and having an oil stopping ditch 10, 12 is the ball-bearing, 13 is the housing, and 14 is the shaft.

A second embodiment is shown in FIGS. 3 and 4 and which comprises a sliding enclosure which is fixed to the shaft and which revolves together with the shaft, and a sealed main body, which is fitted between the said sliding enclosure and a fixed enclosure fixed to the housing, to form a close association between the two. As shown in FIGS. 3 and 4 saw-toothed ribs 3 are provided in a slanting step-ladder fashion, the pointed edges of which face outward, to the end of the lower sliding portion 2 of the U-shaped cross-section sealed main body 1 made of synthetic rubber, a sliding rib 5 is provided along the inner rim of the upper sliding portion 4, a reinforcing metal ring 6 is fitted to both the upper and lower part of the sliding portion 2, and a spiral spring 7 is fixed between rings 6. The said sealed main body 1 is circumscribed by and pressed against the sliding enclosure 11, the inner side of which is fixed with shaft ribs 8, the lower portion being spread out into a horn shape with a slanting wall 9 which fits the slant of rib 3, and which has an oil stopping ditch 10 at the lower portion, the said sealed main body 1 being further circumscribed and pressed by a housing enclosure 17, which has housing ribs 18 fixed onto the outside. 19 is the ball bearing, 15 is the housing and 16 is the shaft.

The above has been a description of this invention. Lubricating oil such as grease is inserted into the space between the sealed main body 1 and the sliding enclosure 11 and the outfit is attached to the shaft as shown in FIG. 2 and FIG. 4. When water pressure is applied to the rib 3 through the circumferential gap the edges of the ribs are pressed by the slanting wall 9 making a close contact permitting perfect effect of preventing the entrance of muddy water, earth and sand contaminated water, and other foreign matters. Even though the lubricating oil should come down toward the ribs 3 the edge of the rib adjacent to the stopping ditch comes in contact with the inner side of the ditch, and since it will not bend any further contact will not be lost. Moreover, sealing effect will be retained because lubricating oil collects within the ditch 10 thus making the outfit very suitable for vertical pumps, the shaft of which is positioned vertically.

While the preferred embodiments of this invention has been shown and described therein, it is obvious that many details may be changed without departing from the spirit and scope of the appended claim.

This invention is claimed as follows:

A pump seal to be disposed between stationary and rotating cylindrical members, comprising in combination,
  a resilient main body having a cylindrical wall designed to engage one of said members and having a U-shaped external cross-section, the arms of the U extending towards the other of said members with a plurality of saw-tooth ribbed edges disposed in step ladder fashion at the lower portion of said main body between said members;
  an enclosure surrounding said main body, the lower portion thereof having a funnel shape conical wall conforming generally to the step ladder inclination of said saw-toothed ribbed edges;
  upper and lower metal reinforcing rings along both sides of said main body defined by the arms of said U-shaped cross-section; and,
  a spiral spring coiled around said main body between said upper and lower reinforcing rings.

References Cited by the Examiner

UNITED STATES PATENTS 2,157,597  5/39  Dupree _____ 103—111
2,444,901  7/48  Sloan _____ 277—42

EDWARD V. BENHAM, Primary Examiner.
SAMUEL ROTHBERG, Examiner.